US008102628B2

(12) United States Patent
Ota et al.

(10) Patent No.: US 8,102,628 B2
(45) Date of Patent: Jan. 24, 2012

(54) DISK DRIVE AND HEAD ASSEMBLY HAVING HOLE SEQUENCES

(75) Inventors: Ryohei Ota, Kanagawa (JP); Eiji Soga, Kanagawa (JP); Nobumasa Nishiyama, Kanagawa (JP); Hiroyasu Tsuchida, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 952 days.

(21) Appl. No.: 11/726,614

(22) Filed: Mar. 21, 2007

(65) Prior Publication Data
US 2007/0230059 A1    Oct. 4, 2007

(30) Foreign Application Priority Data

Mar. 31, 2006  (JP) .................................. 2006-096511

(51) Int. Cl.
G11B 21/16    (2006.01)
G11B 5/48    (2006.01)
(52) U.S. Cl. ................ 360/245.9; 360/244.3; 360/244.8
(58) Field of Classification Search ............... 360/245.8, 360/245.9, 246, 244.2, 244.3, 245, 245.2, 360/245.3, 125.31, 125.74, 234.4, 234.5, 360/244.8
See application file for complete search history.

(56) References Cited

U.S. PATENT DOCUMENTS

| 6,608,736 | B1 | 8/2003 | Klaassen et al. | |
| 6,731,467 | B1 | 5/2004 | Balakrishnan | |
| 6,891,700 | B2 | 5/2005 | Shiraishi et al. | |
| 7,294,568 | B2 | 11/2007 | Goodner et al. | |
| 7,408,744 | B1 * | 8/2008 | Cuevas | 360/244.8 |
| 7,453,143 | B2 | 11/2008 | Dutta | |
| 7,489,479 | B2 | 2/2009 | Arya et al. | |
| 7,557,303 | B2 | 7/2009 | Tang | |
| 7,595,555 | B2 | 9/2009 | Clarke et al. | |
| 2004/0114268 | A1 * | 6/2004 | Satoh et al. | 360/245.8 |
| 2006/0056110 | A1 | 3/2006 | Kato et al. | |

(Continued)

FOREIGN PATENT DOCUMENTS

JP    2002-251706 A    9/2002

(Continued)

OTHER PUBLICATIONS

Digest of the 18th magnetic recording conference, http://www.ece.umn.edu/MINT/TMRC2007/program/tmrc2007_digest_final.pdf, 96 pages, May 21-23, 2007.

(Continued)

*Primary Examiner* — Craig A. Renner
(74) *Attorney, Agent, or Firm* — Mahamedi Paradice Kreisman LLP; Christopher J. Brokaw

(57) ABSTRACT

Embodiments disclose hole sequences that are formed in the metal layer of a trace to adjust rigidity and crosstalk noise resulting from the hole sequences is thereby suppressed. A suspension according to one aspect of the invention includes a trace adapted to transmit a signal of a head slider. The trace partially extends along the side surface of the suspension. The trace includes a metal layer, a plurality of transmission lines formed above the metal layer and an insulating layer. A hole sequence overlapping the transmission lines is formed in part of the metal layer, which contributes to a reduction in transmission loss. Another hole sequence of the metal layer is formed at a position opposed to the hinge portion of the suspension. This reduces the rigidity of the wiring structure portion in the hinge portion, thereby preventing interference with the behavior of the suspension at the hinge portion.

9 Claims, 8 Drawing Sheets

U.S. PATENT DOCUMENTS

2006/0158785 A1* 7/2006 Arya et al. .................... 360/246

FOREIGN PATENT DOCUMENTS

| JP | 2002-269712 | 9/2002 |
|----|-------------|--------|
| JP | 2003-151114 | 5/2003 |
| JP | 2006-079775 | 3/2006 |
| JP | 2007-272984 | 10/2007 |

OTHER PUBLICATIONS

Jang, Eunkyu, "Three-dimensional electromagnetic analysis of hard disk drive suspension interconnects with periodic apertures in reference plane", Journal of Applied Physics, vol. 105, No. 7, pp. 07C128-07C128-3, Apr. 2009 (abstract only).

Prachumrasee et al., "Impacts of windowed backing layer on write-to-read coupling on suspension interconnection", Magnetic Recording Conference 2009. APMRC '09. Asia-Pacific, vol. no., pp. 1-2, 14-16 Jan. 2009 (abstract only).

Spencer et al., "Air-Gap Transmission Lines on Organic Substrates for Low-Loss Interconnects", Microwave Theory and Techniques, IEEE Transactions on, vol. 55, No. 9, pp. 1919-1925, Sep. 2007 (abstract only).

* cited by examiner

DISK DRIVE AND HEAD ASSEMBLY HAVING HOLE SEQUENCES

CROSS-REFERENCE TO RELATED APPLICATION

The instant nonprovisional patent application claims priority from Japanese Patent Application No. 2006-096511 filed Mar. 31, 2006 and incorporated by reference herein in its entirety for all purposes.

BACKGROUND OF THE INVENTION

As known, there are a variety of disk drives which use different types of media such as optical disks, optical magnetic disks and flexible magnetic disks. Among them, the hard disk drive (HDD) has become so popular as to be one of the more indispensable storage devices for today's computer systems. Further, not limited to computers, the hard disk drive is widening its range of applications more and more due to its superior characteristics, covering moving picture recording/reproducing apparatus, car navigation systems, removable memories for digital cameras and so on.

The HDD includes a magnetic disk for storing data therein, a head slider which reads/writes data from/to the magnetic disk and an actuator which moves the head slider to a desired position above the magnetic disk. The actuator is driven by a voice coil motor to pivot about a pivot shaft, thereby radially moving the head slider over the rotating magnetic disk.

The head slider includes a slider and a head element portion formed on the surface of the slider. The head element portion includes a write element which converts an electric signal to a magnetic field according to recording data to the magnetic disk and/or a read element which converts a magnetic field from the magnetic disk to an electric signal. The actuator has a resilient suspension and the head slider is fixedly attached to the suspension. The head slider supported by the actuator flies above the rotating magnetic disk at a constant gap therebetween.

The suspension includes gimbals supporting the head slider on the magnetic disk facing side and a load beam supporting the gimbals on the magnetic disk facing side. A wiring structure portion (hereunder called the trace) is formed on the actuator to transmit signals between a preamp IC and an element on the head. The preamp IC is mounted on a FPC (Flexible Printed Circuit) on the actuator in the vicinity of a pivot shaft and the trace is connected to the FPC. The transfer signal of the trace is amplified by the preamp IC.

One known structure of the trace includes a metal layer formed continuously to the gimbals, a plurality of transmission lines formed above the metal layer, and an insulating layer which insulates the transmission lines from the metal layer and also one of the transmission lines from the other transmission lines. Since the trace has the metal layer, handling performance during fabrication can be enhanced. For example, patent document 1 (Japanese Laid-Open Patent No. 2002-251706) discloses a trace with a metal layer in which a hole sequence is formed to overlap a signal line. Forming the hole sequence to overlap the signal line reduces parasitic capacity, thereby increasing the data transfer frequency of the trace.

BRIEF SUMMARY OF THE INVENTION

Embodiments in accordance with the present invention disclose hole sequences that are formed in the metal layer of a trace to adjust rigidity and crosstalk noise resulting from the hole sequences is thereby suppressed. In accordance with the particular embodiment shown in FIG. 5, a suspension includes a trace 122 adapted to transmit a signal of a head slider. The trace 122 partially extends along the side surface of the suspension. The trace 122 includes a metal layer, a plurality of transmission lines 222 formed above the metal layer and an insulating layer. A hole sequence 255 overlapping the transmission lines is formed in part of the metal layer, which contributes to a reduction in transmission loss. Another hole sequence 256 of the metal layer is formed at a position opposed to the hinge portion 361 of the suspension. This reduces the rigidity of the wiring structure portion in the hinge portion, thereby preventing interference with the behavior of the suspension at the hinge portion.

DETAILED DESCRIPTION OF THE INVENTION

Figure 1:
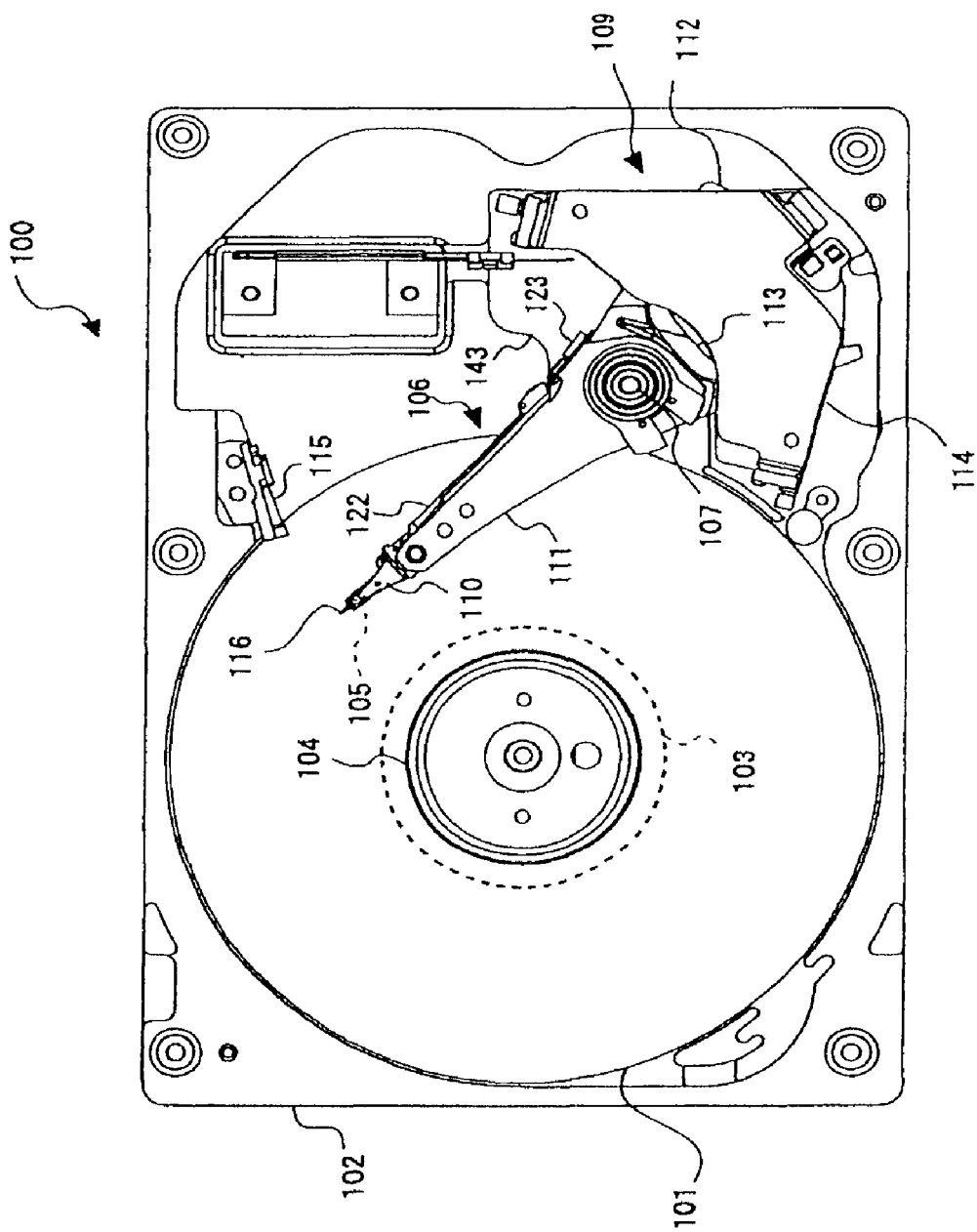
FIG. 1 is a schematic plan view illustrating the entire configuration of a hard disk drive according to the present embodiment.

Embodiments in accordance with the present invention relate generally to a disk drive and a head assembly used in the disk drive, and particularly to a wiring structure portion adapted to transfer head signals.

There is known a HDD in which a head slider or an actuator has an electric element as well as a head element portion. Such a HDD has a transmission line adapted to transmit a signal other than read/write signals. For instance, there is a technique in which a heater is formed in a head slider so that a head element portion can be thermally expanded to adjust a head-magnetic disk distance (clearance). The adjustment of the clearance can increase recording density. The trace has a transmission line adapted to transmit an electric current (signal) flowing in the heater in addition to the read/write transmission line.

It becomes more complicated in design to form hole sequences in a metal layer as the number of transmission lines possessed by the trace increases. A hole sequence that overlaps a line pair transmitting a high frequency signal, such as a write line pair, can increase a transmission loss of the line pair. However, one important point in designing a hole sequence is the effect of the hole sequence on signal transmission characteristics.

In particular, if there is a transmission line in addition to transmission lines adapted to transmit a read signal and a write signal, an effect between transmission lines due to the hole sequence becomes problematic in addition to the characteristics of the transmission line per se overlapped by the hole sequence. More specifically, it is important to take into account crosstalk noise between the transmission lines due to formation of the hole sequence. If the hole sequence is designed without careful consideration, the crosstalk noise would increase between transmission lines, particularly, between a write line pair and a read line pair, which will deteriorate data read-out characteristics.

In designing the trace, it is important to design the rigidity of the trace. In particular, as increased recording density requires more precise head positioning, it becomes important to vary the rigidity depending on a specific position of the trace. In other words, it becomes important to lower the rigidity of a particular portion of the trace with the rigidity of the entire trace maintained unchanged. Specifically, the current structure of the miniaturized actuator is required to reduce the rigidity of the particular region of the trace in such a manner as not to interfere with the behavior of the hinge portion of the load beam.

In order to reduce the rigidity of the trace, it is needed only to increase the opening area of a metal layer. Accordingly, the rigidity of the trace can be reduced by increasing the number of hole sequences formed in the metal layer. However, as described above, it is important for the formation of the hole sequences to take into account not only the trace rigidity but also transmission characteristics, particularly, crosstalk noise between the transmission lines.

A head assembly according to one aspect of the present invention includes a head adapted to access a disk on which data is recorded, a head support member supporting the head, and a wiring structure portion. The wiring structure portion includes a metal layer, a plurality of transmission lines extending, without intersecting with each other, above the metal layer and connected to the head, and an insulating layer formed between the metal layer and the plurality of transmission lines. The plurality of transmission lines include a write line pair adapted to transmit a write signal, a read line pair adapted to transmit a read signal, and a third line pair adapted to transmit a signal different from the write signal and the read signal. The metal layer includes a first hole sequence overlapping the write line pair, spaced apart from the other transmission lines and arranged in a direction where the write line pair extends, and a second hole sequence spaced apart from the write line pair, overlapping a line pair different from the write line pair and arranged in a direction where the line pair different from the write line pair extends. In the formation of the plurality of hole sequences in the wiring structure portion including a line pair in addition to the write line pair and the read line pair, the hole sequence overlapping the write line pair is spaced apart from the other transmission lines and also another hole sequence is spaced apart from the write line pair. Therefore, crosstalk noise resulting from the write signal toward the read signal can be reduced.

The third line pair can extend along and between the write line pair and the read line pair. This can reduce the effect of the write signal on the read signal.

In one aspect the second hole sequence overlaps the read line pair and is spaced apart from the other transmission lines. This can reduce the transmission loss of the read line pair. Yhe metal layer can have a third hole sequence that overlaps the third line pair, is spaced apart from the other transmission lines and is arranged in a direction where the third line extends. This can reduce rigidity while reducing the effect between the transmission lines. It is preferred that the third line pair extend along and between the write line pair and the read line pair.

In another aspect, a line pair adjacent to the write line pair extends along and between the line pair overlapped by the second hole sequence and the write line pair, and the metal layer has no holes overlapping the line pair adjacent to the write line pair, between the first hole sequence and the second hole sequence. Since the metal layer below the line pair adjacent to the write line pair is in a plain state, noise of a write signal resulting from the hole sequence toward the read signal can be reduced. In addition, preferably, the line pair overlapped by the second hole sequence is the read line pair and the line pair adjacent to the write line pair is the third line pair. This can further reduce crosstalk noise from the write signal toward the read signal.

A head assembly according to another aspect of the present invention includes a head adapted to access a disk on which data is recorded, a suspension supporting the head and including a hinge portion generating a resilient force balancing with a lifting force of the head, and a wiring structure portion partially extending along the suspension. The wiring structure portion includes a metal layer; a plurality of transmission lines extending, without intersecting with each other, above the metal layer and connected to the head; and an insulating layer formed between the metal layer and the plurality of transmission lines. The metal layer has in a continuous region including a position opposed to the hinge portion a first hole sequence overlapping a line pair adapted to transmit a signal, spaced apart from the other transmission lines and arranged along the line pair; and a second hole sequence spaced apart from the line pair, overlapping another transmission line and arranged along the transmission line. The first hole sequence continuously extends beyond the region toward the head and the side opposite to a leading end of the head and the second hole sequence terminates at ends of the region. Since the region including a position opposed to the hinge portion includes the first and second hole sequences, the rigidity of the region can be selectively reduced.

A disk drive according to another aspect of the present invention includes a motor for rotating a disk on which data is recorded; a head adapted to access the disk; and an actuator for moving a head flying above the disk by supporting the head and pivoting about a pivot shaft. The actuator includes a suspension supporting the head and including a hinge portion generating a resilient force balancing with a lifting force of the head; an arm supporting the suspension; and a wiring structure portion partially extending along respective side surfaces of the suspension and the arm. The wiring structure portion includes a metal layer; a plurality of transmission lines extending, without intersecting with each other, above the metal layer and connected to the head; and an insulating layer formed between the metal layer and the plurality of transmission lines. The metal layer includes in a continuous region including a position opposed to the hinge portion a first hole sequence overlapping a line pair adapted to transmit a signal, spaced apart from the other transmission lines and arranged along the line pair; and a second hole sequence spaced apart from the line pair, overlapping another transmission line and arranged along the transmission line. The first hole sequence continuously extends beyond the region toward the head and the side opposite to a leading end of the head and the second hole sequence terminates at ends of the region.

According to certain embodiments of the present invention, the wiring structure portion adapted to transmit a head signal can be formed with hole sequences in a more appropriate electrical and mechanical manner.

Embodiments according to the present invention will be described below. For clarification of description, the below description and drawings are partially omitted and simplified as appropriate. Note that like reference numerals are affixed to identical elements in every drawing and duplicate explanation of each element is omitted as necessary for clarified description. In the following, preferred embodiments of the invention will be described by taking as an example a hard disk drive (HDD), which is an example of disk drives.

A suspension used in the HDD of the present embodiment includes a wiring structure portion connected to a head slider and adapted to transmit a signal of the head slider. The wiring structure portion partially extends along a side surface of the suspension. The wiring structure portion includes a metal layer, a plurality of transmission formed above the metal layer, and an insulating layer insulating the transmission lines from the metal layer and also one of the transmission lines from the other transmission lines. A hole sequence overlapping a transmission line is formed in part of the metal layer. This contributes to a reduction in transmission loss. The number of hole sequences of the metal layer is increased at a position opposed a hinge portion of the suspension. This can reduce the rigidity of the wiring structure portion at the hinge portion, thereby preventing interference with the behavior of the suspension at the hinge portion.

The general construction of a HDD to which the invention is applied is described with reference to FIG. 1. FIG. 1 is a schematic plan view illustrating the general construction of the HDD 100 according to the embodiment. FIG. 1 illustrates a state of the HDD 100 in which an actuator is located for operation. A magnetic disk 101 is a nonvolatile recording disk as one of disks which records data when its magnetic layer is magnetized. A base 102 is one of casings or a disk enclosure. The base 102 is secured to a cover (not shown) to close the upper opening of the base 102 via a gasket so that components for the HDD may be accommodated therein.

A clamp 104 fastens the magnetic disk 101 to a spindle motor 103. The magnetic disk 101 is drivingly rotated at a desired angular speed (velocity) by the spindle motor 103 fixed to the bottom of the base 102. A head slider 105, exemplified as one of heads, accesses the magnetic disk 101. The head slider 105 includes a head element part and a slider fastening the head element part thereto. An actuator 106 holds and moves the head slider 105. The actuator 106 is rotatably held by a pivot shaft 107 and includes a voice coil motor (VCM) 109 serving as a mechanism for pivoting itself. The actuator 106 includes various constituent elements, namely, a suspension arm 110, an arm 111 and a coil support 112, which are joined together in this order from its leading end on which the head slider 105 is positioned.

The configuration of the suspension 110 supporting the head slider 105 will be described in detail later. The coil support 112 supports a flat coil 113. An upper stator magnet support plate 114 and a lower stator magnet support plate (not shown) put the flat coil 113 therebetween. A ramp 115 is disposed close to the outer circumference of the magnetic disk 101 to have a withdrawal position to which the head slider 105 is unloaded from above the surface of the magnetic disk 101 when rotation of the magnetic disk 101 is stopped or in other situations. A tab 116 is formed at the leading end of the suspension 110 and slides over the ramp 115 during loading/unloading.

In order to read/write data from/to the magnetic disk 101, the actuator 106 moves the head slider 105 over the data area on the surface of the rotating magnetic disk 101. Pivotal motion of the actuator 106 enables the head slider 105 to move along the radial direction of the recording surface of the magnetic disk 101. Equilibrium between a force generated on an ABS of the slider (air bearing surface) facing the magnetic disk 101 and a pressing force resulting from the suspension 110 causes the head slider 105 to fly above the magnetic disk 101 at a desired gap therebetween.

The signal generated in the head slider 105 is transferred by a trace 122 secured to the actuator 106. The trace 122, exemplified as one of wiring structure portions, has one end connected to the head slider 105 and the other end connected to an FPC 143 having a preamp IC 123 mounted thereto. The trace 122 transmits signals between the head slider 105 and the preamp IC 123. The trace 122 is formed integrally with the suspension 110. The trace 122 extend, on the side opposite the side facing the magnetic disk 101 with respect to the arm 111, from the suspension 110 along a side surface of the arm 111 that faces the pivotal movement direction of the arm 111. The HDD 100 according to the present embodiment has one characteristic in the configuration of the trace 122, which will be discussed in detail later.

The FPC 13 is connected, in a circuitry manner, to a control circuit board (not shown) mounted on the rear surface of the base 102. The FPC 143 transmits signals between the control circuit and the preamp IC 123. The control circuit on the control circuit board executes the operational control and its signal processing on the HDD 100.

Figure 2:
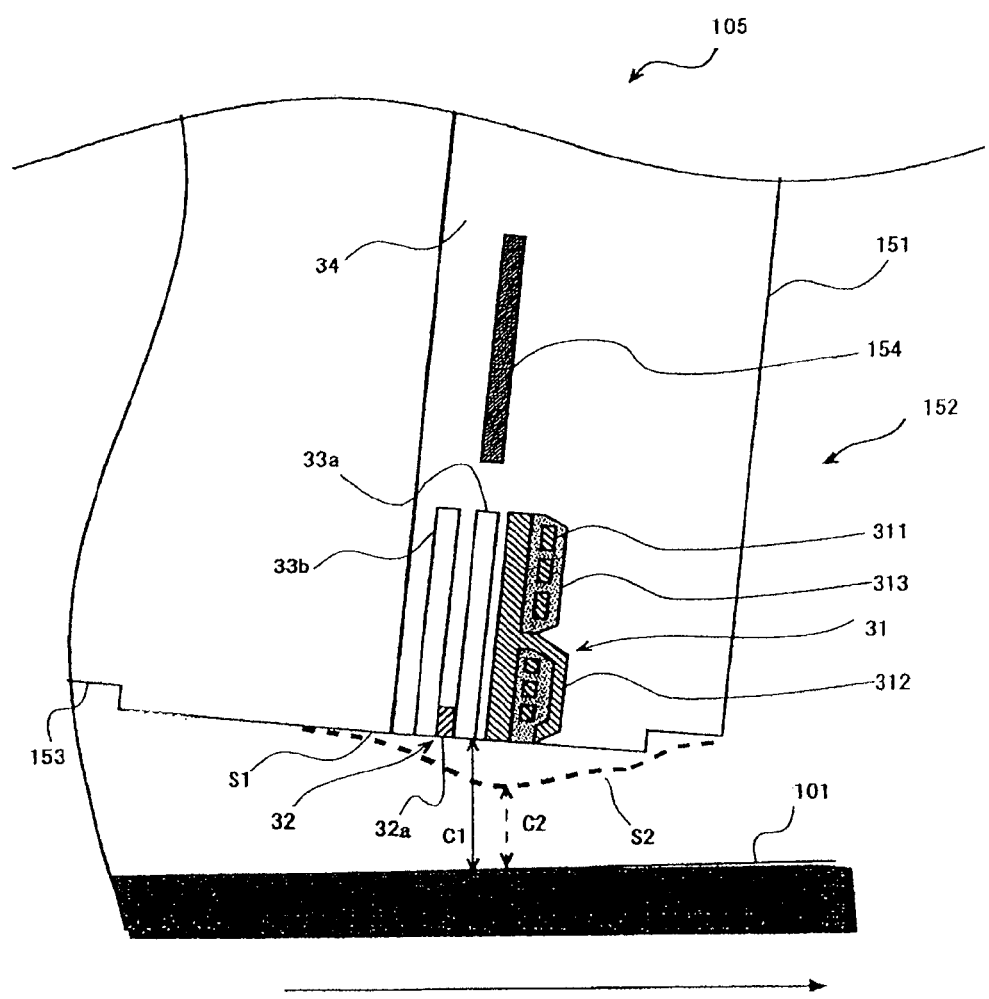
FIG. 2 is a schematic cross-sectional view illustrating the configuration of a head slider provided with a heater according to the present embodiment.

The head slider 105 of the present embodiment includes a heater as well as the head element part. The heater causes the head element part to protrude toward the magnetic disk 101, thereby adjusting a clearance, a distance between the head element part and the magnetic disk 101. This clearance control is called thermal fly control (TFC). FIG. 2 is a cross-sectional view illustrating the configuration of part of the head slider 105, namely, its air outflow end face (trailing end face) 151 and the neighbor thereof. The magnetic disk 101 rotates from the left to the right in FIG. 2. The head slider 105 includes the head element part 152 and the slider 153 supporting the head element part 152.

The head element part 152 reads and writes magnetic data from and to the magnetic disk 101. The head element part 152 includes a read element 32 and a write element 31 disposed on the trailing side. The right element 31 is an inductive element which generates a magnetic field between magnetic pole pieces 312 by an electric current flowing a write coil 311, thereby writing magnetic data to the magnetic disk 101. The read element 32 is a magnetoresistive type element and includes a magnetoresistive element $32a$ with magnetic anisotropy. The read element 32 reads out the magnetic data recorded in the magnetic disk 101 based on its resistance value varied depending on the magnetic field from the magnetic disk 101.

The magnetic resistance element $32a$ is sandwiched between magnetic shields $33a$, $33b$ and the write coil 311 are surrounded by an insulating film 313. The head element part 152 includes a protection film 34 such as alumina for the write element 31 and the read element 32. The heater 154 is formed in the vicinity of the write element 31 and the read element 32. The heater 154 of the embodiment is disposed on the side opposite the side of the head element part 152 facing the magnetic disk 101. The heater 154 can be formed by meandering a thin resistive element made of permalloy and burying its gap with alumina.

When the preamp IC 123 applies the current to the heater 154, the heat generated by the heater 154 allows the head element part 152 to projectingly deform at the vicinity thereof. During non-heating, the air bearing surface of the head slider 105 is shaped as indicated with symbol S1 and the clearance, the distance between the head element part 152 and the magnetic disk 101 is indicated with symbol C1. A protruding shape S2 resulting by heating the heater 154 is schematically indicated with a broken line in FIG. 2. The head element part 152 is close to the magnetic disk 101, where clearance C2 is smaller than the clearance C1. Note that FIG. 2 is a conceptual diagram, that is, the dimensional relationship is inaccurate. The amount of protrusion is on the nanometer order (several nanometers).

Figure 3:
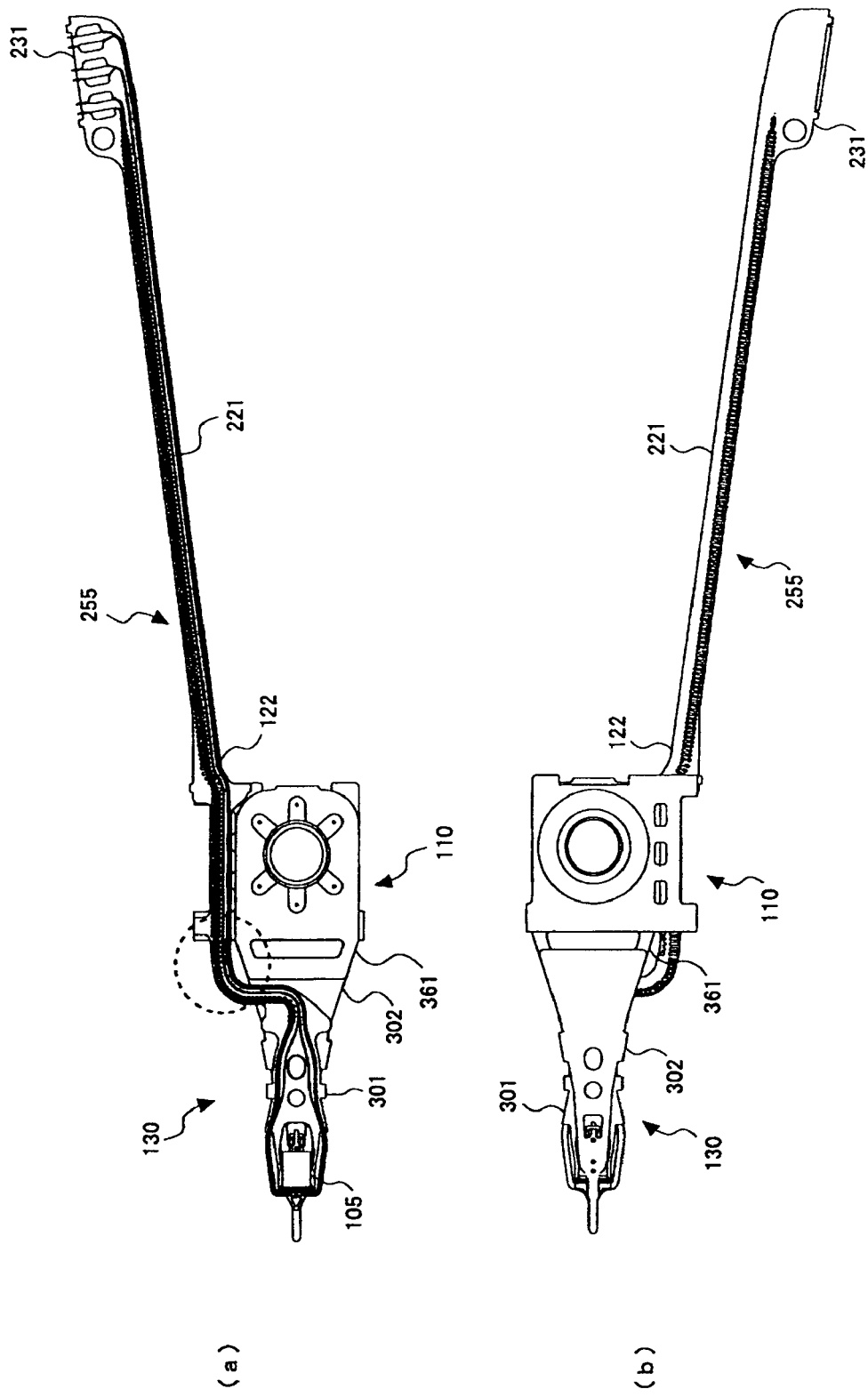
FIGS. 3(a-b) are illustrations of schematic plan views which illustrate the configuration of a head gimbal assembly according to the present invention.
Figure 4:
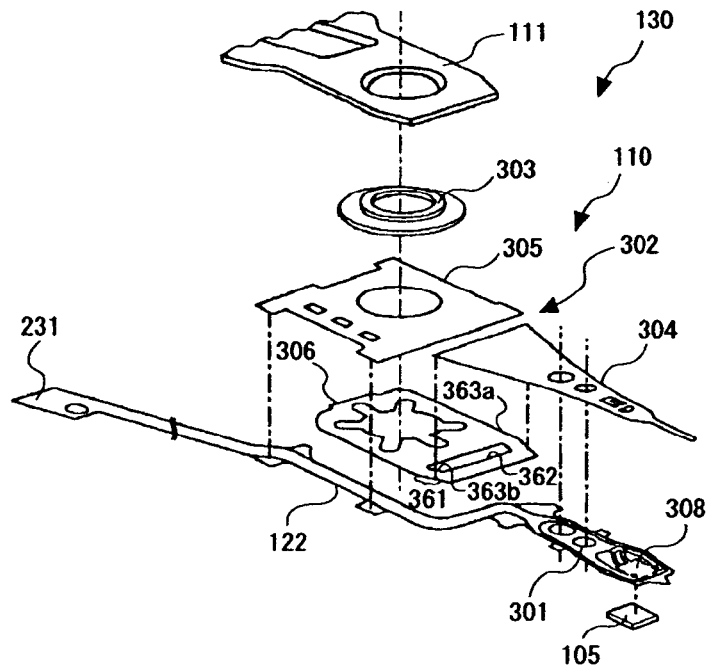
FIG. 4 is an exploded perspective view schematically illustrating the configuration of the head gimbal assembly according to the present embodiment.

FIGS. 3(a) and 3(b) are schematic plan views illustrating the configuration of a head gimbal assembly (HGA) 130 according to the present embodiment. FIG. 3(a) illustrates a plane confronting the recording surface of the magnetic disk 101 and FIG. 3(b) illustrates its underside surface. FIG. 4 is a schematic exploded perspective view of the configuration of the HGA 130. The HGA 130 is an assembly of the suspension 110 and the head slider 105.

As shown in FIG. 4, the suspension 110 of the present embodiment is composed of a plurality of constituent members, i.e., gimbals 301, a load beam 302 and a mount plate 303. The load beam 302 is of a multi-beam type, which is composed of a plurality of constituent members, i.e., a beam plate 304, a base plate 305 and a hinge plate 306. Note that each constituent element may be composed of a plurality of constituent members or a single constituent member.

In the present embodiment, the actuator 106 includes a plurality of arms 111 and HGAs 130. FIG. 4 illustrates the configuration of the uppermost HGA 130. The arm 111 is typically formed of stainless steel or aluminum and formed with necessary shapes such as a hole and the like by etching. This hole allows the pivot shaft 107 to extend through. The load beam 302 is fastened to a surface of the arm 111 opposed to the magnetic disk 101.

The hinge plate 306 has a hinge portion 361, which has a hole 362 adapted to reduce the rigidity thereof. In addition, the hinge plate 306 has rod-like metal layers 363a, 363b, on both sides of the hole 362 with respect to the rotating direction. Thus, the hinge plate 306 exhibits a spring function that provides a negative pressure which counteracts the lifting force of the head slider 105 generated by an airflow resulting from the rotation of the magnetic disk 101. The beam plate 304 exhibits a rigidity function that supports the gimbals 301 in a stable posture during the pivotal movement of the actuator 106. The base plate 305 has the strength to fasten the load beam 302 to the arm 111. The base plate 305 and the arm 111 are fastened to the mount plate 303. The hinge plate 306 is fastened to the beam plate 304 and the base plate 305.

The gimbals 301 may be formed of e.g. stainless steel and exhibits desired resilience. A gimbals tongue 308 is formed at a front part of the gimbals 301. The head slider 105 is fixedly attached to the gimbal tongue 308 with a low-elastic epoxy resin or the like. The gimbal tongue 308 causes the head slider 105 to turn about the dimple of the beam plate 304 in the pitching or rolling direction.

The trace 122 is formed to continuously extend from an end of the gimbals 301. A plurality of transmission lines connected to the circuitry on the head slider 105 is formed on the gimbals 301. The wiring structure on the gimbals 301 is described. A polyimide insulating layer is formed on a stainless metal layer as a base material of the gimbals 301. A conductor layer forming the transmission lines is formed on the polyimide insulating layer and a polyimide protecting layer is formed on the conductor layer. The wiring structure on the gimbals 301 can be formed by the well-known photolithographic etching technique. Each transmission line is connected at its one end to the circuitry on the head slider 105 to transmit signals between the preamp IC 123 and the head slider 105.

The trace 122 extends from a lateral part of the gimbals 301 on the side opposite the side of the gimbals 301 facing the rotating shaft of the magnetic disk 101. The trace 122 extending from the gimbals 301 further extends toward the side of the pivot shaft 107 (the rear of the actuator) along the sides of the load beam 302 and arm 111 (the side opposite the side of the center of the magnetic disk 101 with respect to the arm 111). The trace 122 is partially welded to the base plate 305 by spot welding.

Figure 6:
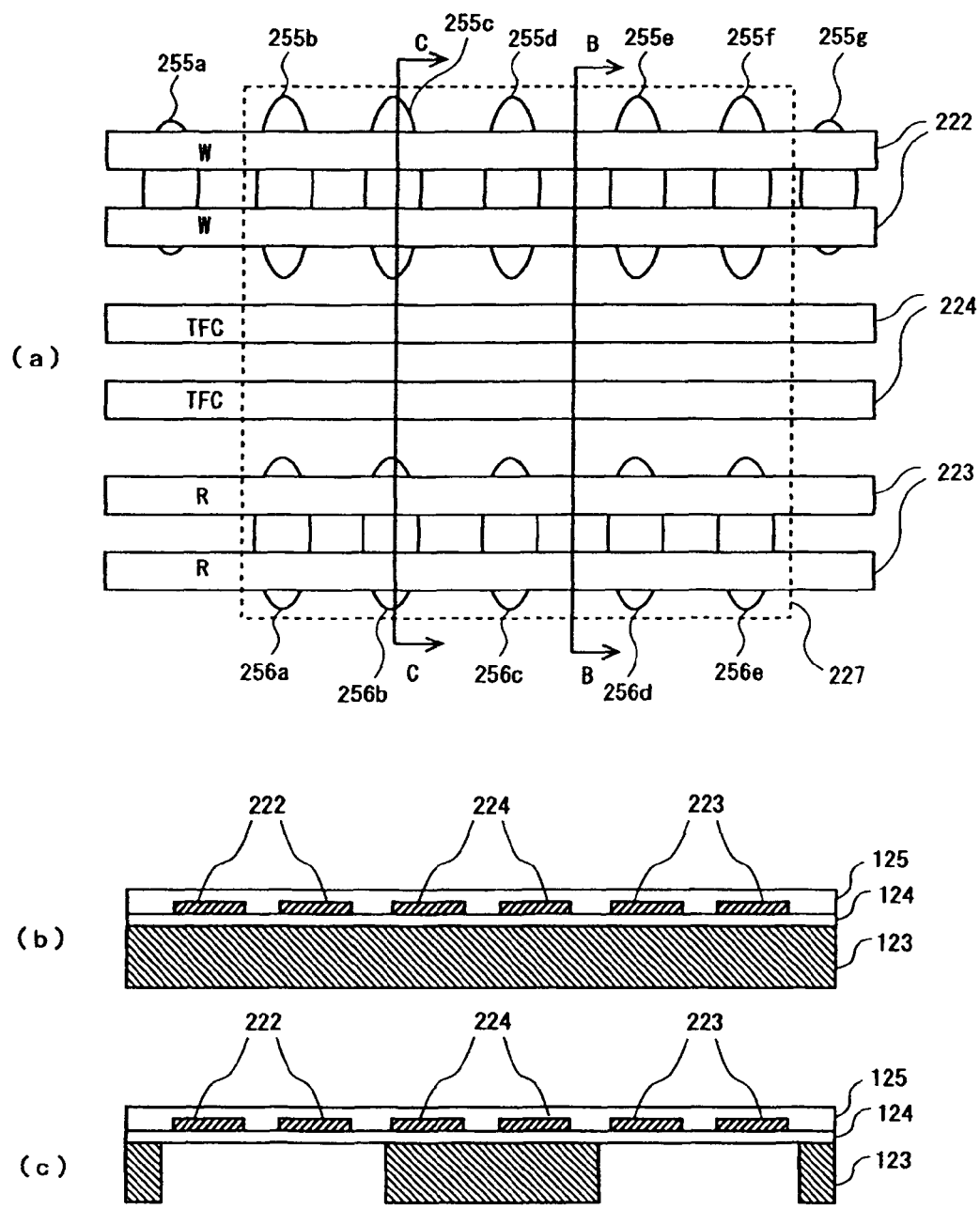
FIGS. 6(a-c) are illustrations of schematic diagrams which illustrate an structure of transmission lines and a hole sequence of the trace in the region opposed to the hinge portion according to the present invention.

The trace 122 is formed integrally with the gimbals 301 in this embodiment. Similar to the wiring structure on the gimbals 301, the trace 122 includes a stainless metal layer as a base material, a polyimide insulating layer formed on the stainless metal layer, transmission lines formed on the polyimide insulating layer and a polyimide protecting layer (see FIG. 6(b)). Each layer of the trace 122 is formed to join continuously with a corresponding layer of the wiring structure on the gimbals 301.

The trace 122 is formed at its rear end (pivot shaft side end) with a tab 231, a projection, adapted to establish connection with the FPC 143. The tab 231 is formed to have a width (a lateral length of the upper surface of the arm) greater than that of a portion (called the tail 221) extending between the tab 231 and an end of the gimbals 301. The tab 231 is formed on its lower surface (the surface opposite the surface facing the arm) with a plurality of pads to enable solder connection with the FPC 143. Each of the pads is connected to a corresponding one of the transmission lines of the trace 122. The tab 231 is connected to the FPC 143 in the vicinity of the pivot shaft 107, specifically to the preamp IC arranged on the FPC in a circuitry manner.

Referring again to FIG. 3, the trace 122 of the present embodiment is formed with a hole sequence or hole row 255 comprising a plurality of holes in its metal layer. The hole sequence 255 starts from on the gimbals 301 and finishes at the tab 231. The formation of the hole sequence 255 in the metal layer can reduce the transmission loss of the transmission lines overlapped thereby. The hole sequence of the metal layer will be detailed later.

The trace 122 extends from the suspension 110 to the side opposite the side of the gimbals 301 facing the rotating shaft of the magnetic disk 101 and bends toward the pivot shaft 107 along the suspension 110. The trace 122 passes a position opposed to the hinge portion 361 and further extends along the load beam 302. At the end of the load beam 302 on the arm side, the trace 122 slightly bends to be apart from the load beam 302, and then extends linearly to serve as the tail 221. The end of the tail 221 opposed to the side of the head slider 105 connects with the tab 231 having a width greater than that of the tail 221.

Figure 5:
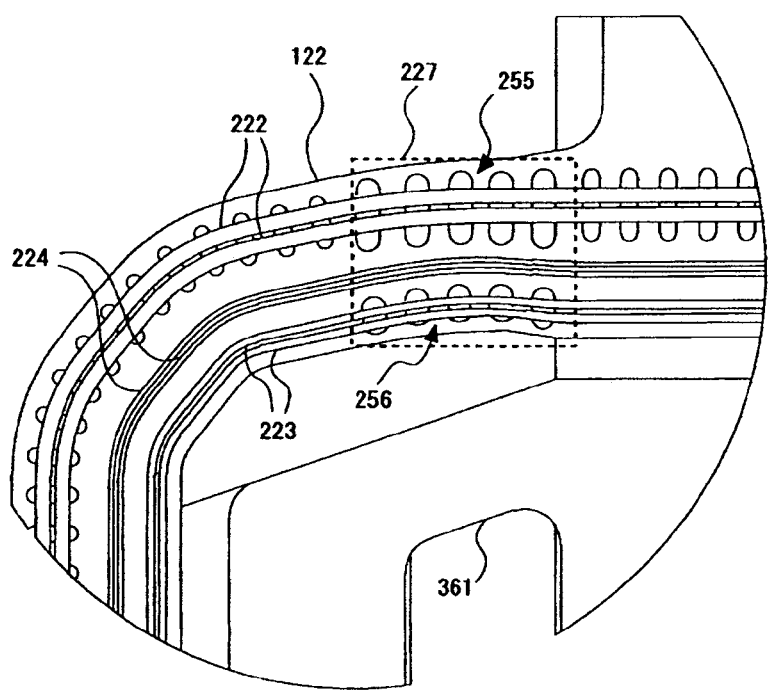
FIG. 5 is a schematic plan view illustrating the structure of a trace in a region opposed to a hinge portion according to the present embodiment.

FIG. 5 is an enlarged diagram illustrating the configuration of the neighbor of the hinge portion 361 encircled in FIG. 3(a). The trace 122 includes a write line pair 222 connected to the write element to transmit write signals, a read line pair 223 connected to the read element to transmit read signals and a TFC line pair 224 connected to the heater to transmit heater signals. The TFC line pair 224 extends along and between the write line pair 222 and the read line pair 223.

As shown in FIG. 5, in part of a continuous region 227 including a position opposed to the hinge portion 361, the trace 122 includes two hole sequences 255, 256. The hole sequence 255 overlaps the write line pair 222 and is spaced apart from the other transmission lines, that is, does not overlap them. The hole sequence 255 is arranged in a direction where the write line pair 222 extends and its holes are spaced apart from each other. The hole sequence 256 overlaps the read line pair 223 and is spaced apart from the other transmission lines. The hole sequence 256 is arranged in a direction where the read line pair 223 extends and its holes are spaced apart from each other.

FIG. 6(a) is a schematic plan view illustrating the transmission lines and hole sequences in the region 227 opposed to the hinge portion 361 and its neighbor. FIG. 6(b) is a schematic cross-sectional view of the trace 122 taken along section line B-B of FIG. 6(a). FIG. 6(c) is a schematic cross-sectional view of the trace 122 taken along section line C-C of FIG. 6(a). As shown in FIGS. 6(b) and 6(c), the trace 122 includes the metal layer 123, the insulating layer 124 over the metal layer 123, the transmission lines 222-224 on the insulating layer and the insulating protecting layer 125 on the transmission lines 222-224. The insulating layer 124 and insulating protecting layer 125 are typically made of polyimide.

In FIG. 6(a), seven holes 255a-255g of the hole sequence 155 are depicted and all holes, i.e., five holes 256a-256e of the hole sequence 256 are depicted. As described above, the holes 255a-255g are arranged along the write line pair 222 so as to be spaced apart from each other and overlap the write line pair 222 and are spaced apart from the other transmission lines. On the other hand, the holes 256a-256e are arranged along the read line pair 223 so as to be spaced apart from each other and overlap the read line pair 223 and are spaced apart from the other transmission lines. The holes of the hole sequences 255 and 256 are opposed to each other with respect to a direction vertical to the transmission line extending direction, that is, to the rotating direction of the actuator 106.

In the embodiment, the hole sequence 256 is formed only in the region 227 opposed to the hinge portion 361 and the neighbor thereof and terminates at the ends of the region 227. On the other hand, as shown in FIGS. 5, 3(a) and 3(b), the hole sequence 255 exceeds the ends of the region 227 including the position opposed to the hinge portion 361 and extends toward the head slider 105 and the pivot shaft 107 (on the side opposite to the side of the head slider). In this way, the trace 122 of the embodiment is configured such that the region opposed to the hinge portion 361 has the number of hole sequences higher than those of the rear and front regions thereof. This can reduce the rigidity of the region 227 so that interference with the behavior of the hinge portion 361 can be suppressed.

As described above, the hinge portion 361 provides a negative pressure which counteracts the lifting force of the head slider 105 generated by an air current resulting from the rotation of the magnetic disk 101. To more precisely control the flying height of the head, it is important to ensure the free movement of the hinge portion 361, that is, not to interfere with its spring performance. Thus, the hinge portion 361 can give the head slider 105 an appropriate resilient force exerted on the side of the magnetic disk 101.

The rigidity of the trace 122 depends on the area of holes formed in the metal layer. In addition, what is important is an areal ratio of the holes to the metal layer with respect to a direction vertical to the direction along which the transmission lines 222-224 extend. As the total area of the holes increases, that is, as the area of the metal layer decreases, the rigidity of the trace 122 lowers. In order not to interfere with the behavior of the hinge portion 361 as much as possible, it is desirable that the area of the holes be large in the region opposed to the hinge portion 361. On the other hand, the trace 122 requires rigidity as a whole in view of handling during manufacturing processes.

The trace 122 of the embodiment is provided with the hole sequence 256 as well as the hole sequence 255 in the region opposed to the hinge portion 361; therefore, the rigidity can be reduced without impairing the function of the hinge portion 361. In addition, since the hole sequence 256 terminates at the ends of the region 227 including the position opposed to the hinge portion 361, the trace 122 can maintain its rigidity as a whole. In particular, the trace 122 of the embodiment includes only the hole sequence 255 outside the region 227. Accordingly, when the rigidity of the region opposed to the hinge portion 361 can be reduced to a level not higher than a desired value, the entire rigidity can be ensured positively.

In the present embodiment, as shown in FIG. 6(a), the maximum bore diameter of the holes 255b-255f in the region 227 is larger than those of the holes 255a, 255g in the rear and front regions thereof. More specifically, the size of the holes 255b-255f in the direction (rotating direction) along which the transmission lines are arranged is larger than that of the holes 255a, 255g. In this way, it is preferable that the bore diameter of holes in the region whose rigidity should be reduced be made larger than that of the other holes in the same hole sequence. This can reduce the rigidity of such a portion.

It is necessary for the formation of the hole sequences 255, 256 to take into account their electric characteristics as well as rigidity. In order to reduce the rigidity, it is needed only to increase the total area of the holes. However, if the holes are formed by taking into account only the rigidity, the transmission property of each transmission line will be significantly lowered. This point will be explained below. In regard to the electric characteristics, it is important to consider a transmission loss due to an electric current induced to the metal layer 123 and crosstalk between transmission lines transmitting different signals.

FIGS. 7(a) to 7(d) are diagrams for explaining the electric characteristics of the write line pair 222. FIG. 7(a) illustrates the behavior of induced current flowing in the metal layer 123 having the hole sequence 255. On the other hand, FIG. 7(b) illustrates the behavior of induced current flowing in the metal layer 123 not having the hole sequence 255. As shown in FIG. 7(a), the hole sequence 255 reduces the electric current flowing in the metal layer 123.

When an AC write signal flows in the write line pair 222, an electric current is induced in the metal layer 123 so as to flow in a direction opposite to that of the write signal. More specifically, in the example of FIGS. 7(a) and 7(b), an electric current flows from the right to the left in the write line 222a whereas from the left to the right in the write line 222b. As a result, an electric current is induced by the effect of the magnetic field from the left to the right in the figure in a metal layer region just beneath and near the write line 222a. In contrast, an electric current is induced by the effect of the magnetic field from the right to the left in the figure in the metal layer region just beneath and near the write line 222b.

Figure 7:
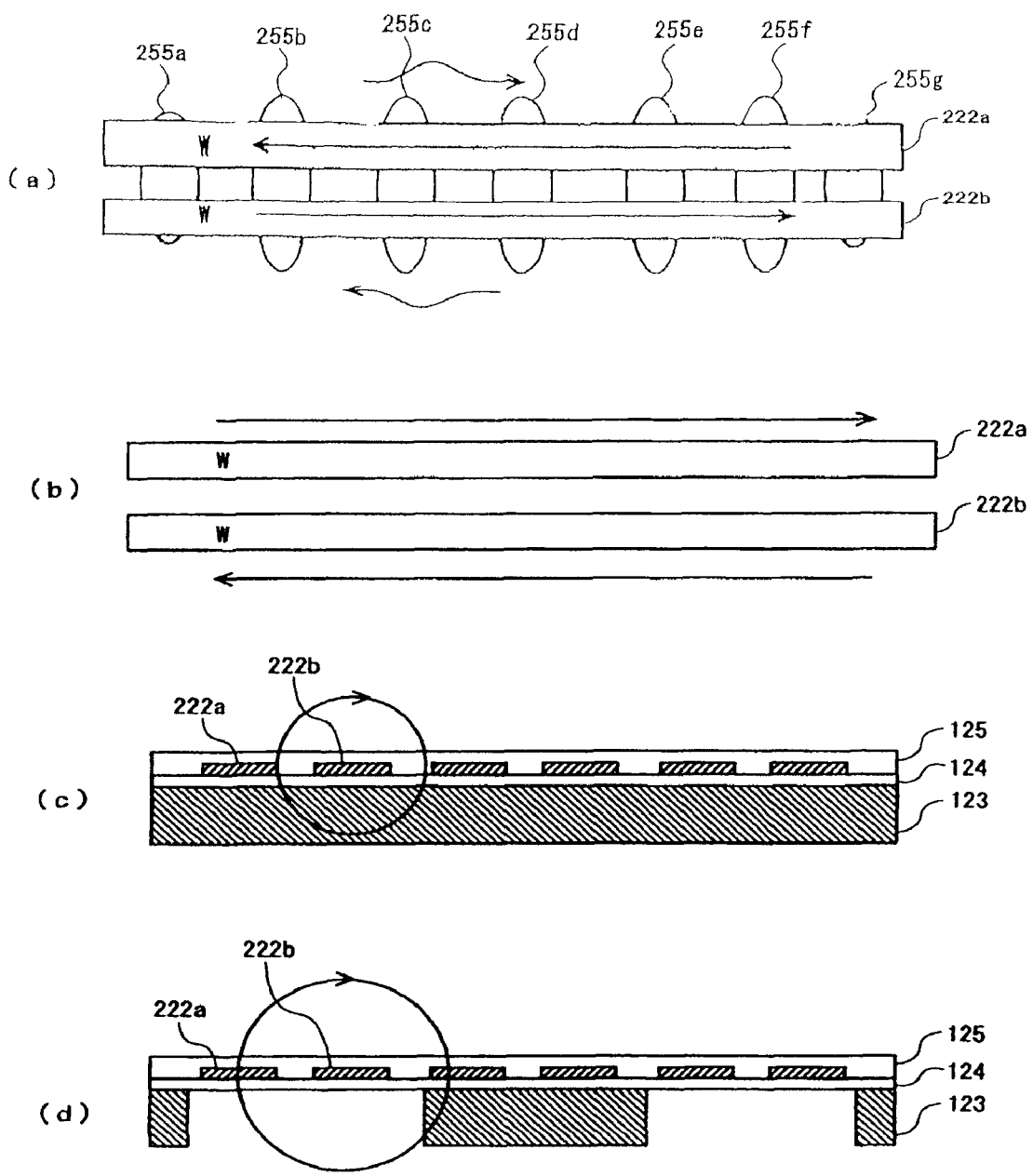
FIGS. 7(a-d) are illustrations of schematic diagrams which illustrate an effect of a hole sequence overlapping a write line pair on an induction current and a generated magnetic field.

The electric current flowing in the metal layer 123 is induced by transmitting the write signal and causes a transmission loss of the write signal represented by the product of the resistance of the metal layer 123 and the electric current. As shown in FIG. 7(*b*), if there is no hole sequence 255 in the metal layer 123, the induction current of the metal layer 123 flows without any interruption. On the other hand, the holes 255*a*-255*g*, as shown in FIG. 7(*a*), each interrupt part of the induction current of the metal layer 123. While part of the electric current flows bypassing the holes 255*a*-255*g*, the value of electric current can be significantly reduced. Thus, a transmission loss in write signal transmission can be significantly reduced.

Also the hole sequence 256 formed to overlap the read line signal 223 exhibits the same effect. The electric current induced in the metal layer 123 increases with the higher frequency of the transmission signal. Therefore, as described above, it is effective to form the hole sequences at such a position as to overlap the write line pair 222 adapted to transmit the high frequency signal. On the other hand, the hole sequence has a small effect on a line pair such as the TFC line pair 224 in which the transmission signal hardly varies or varies at extremely low frequencies.

It is important that the holes 255*a*-255*g* overlap both lines of the write line pair 222 in a similar manner. If the holes overlap only one line of the line pair, the transmission characteristic between the lines varies, which causes a common mode current and also produces a problem of radiation. In addition, it is necessary that the size of a hole and the transmission-directional distance between holes should be determined taking into account the frequency of the transmission signal. If the hole is too large in size for instance, impedance is varied relative to the transmission signal, which causes the reflection of the transmission signal.

As described with reference to FIG. 7(*a*), part of the induction current flows bypassing around the holes. Therefore, what is important is that the hole sequence 255 overlapping the write line pair 222 should be spaced apart from the other transmission lines so that this induction current has no influence on the signals of the other transmission lines. In the preferred embodiment described above, the hole sequence 255 is spaced apart from the TFC line pair 224 and the read line pair 223. Similarly, also the hole sequence 256 overlapping the read line pair 223 is spaced apart from the other transmission lines.

In this way, the hole sequences 255, 256 reduce the transmission loss; however, providing the metal layer 123 is important in order to reduce crosstalk resulting from a magnetic field. FIGS. 7(*c*) and 7(*d*) each specifically illustrate the state of the magnetic field generated by the write lines 222*b*. FIG. 7(*c*) illustrates the magnetic field resulting from an electric current flowing in the write line 222*b* when the metal layer 123 has no holes; FIG. 7(*d*) illustrates the behavior of the magnetic field resulting from the electric current when the metal layer 123 has the holes.

The induction current flows in the metal layer 123 so as to reduce the magnetic field produced by the transmission line. The presence of the holes reduces the induction current, which increases the magnetic field generated by the electric current flowing in the write line 222*b*, thereby increasing crosstalk with the signal flowing in the other transmission lines. Consequently, in designing the hole sequence, it is important to consider both the reduction in transmission loss and the effect of crosstalk noise.

In the viewpoints described above, the trace structure depicted in FIG. 6(*a*) is one preferred mode. Among the write signal, read signal and TFC signal, the variations of frequency and electric current of the write signal are the largest. Therefore, the transmission loss of the write signal poses a problem. In the trace structure shown in FIG. 6(*a*), the hole sequence 255 overlapping the write line pair 222 extends from the position on the gimbals 301 to the tab 231 disposed at the end of the trace 122 to connect with the FPC. Thus, the transmission loss of the trace 122 can be significantly reduced.

The TFC line pair 224 extends along and between the write line pair 222 and the read line pair 223. The TFC signal can be regarded as the steady current as compared with the write signal and read signal. Therefore, it is not substantially necessary to consider crosstalk noise resulting from the TFC signal toward the read signal and write signal. In addition, the read line pair 223 is separated from the write line pair 222 to increase the distance therebetween, whereby crosstalk noise resulting from the write signal toward the read signal can be reduced.

In the region 227, the hole sequence 256 are arranged not to overlap the TFC line pair 224 adjacent to the write line pair 222 but to overlap the read line pair 223 spaced further apart from the write line pair 222. As described above, in order to reduce crosstalk resulting from the magnetic field generated by the write signal, it is preferred that the metal layer 123 remain in a plain state without providing the metal layer 123 with holes. Accordingly, the above structure in which there is no hole sequence overlapping the TFC line pair 224 is effective in reducing crosstalk noise resulting from the magnetic field generated by the write signal toward the read signal.

Figure 8:
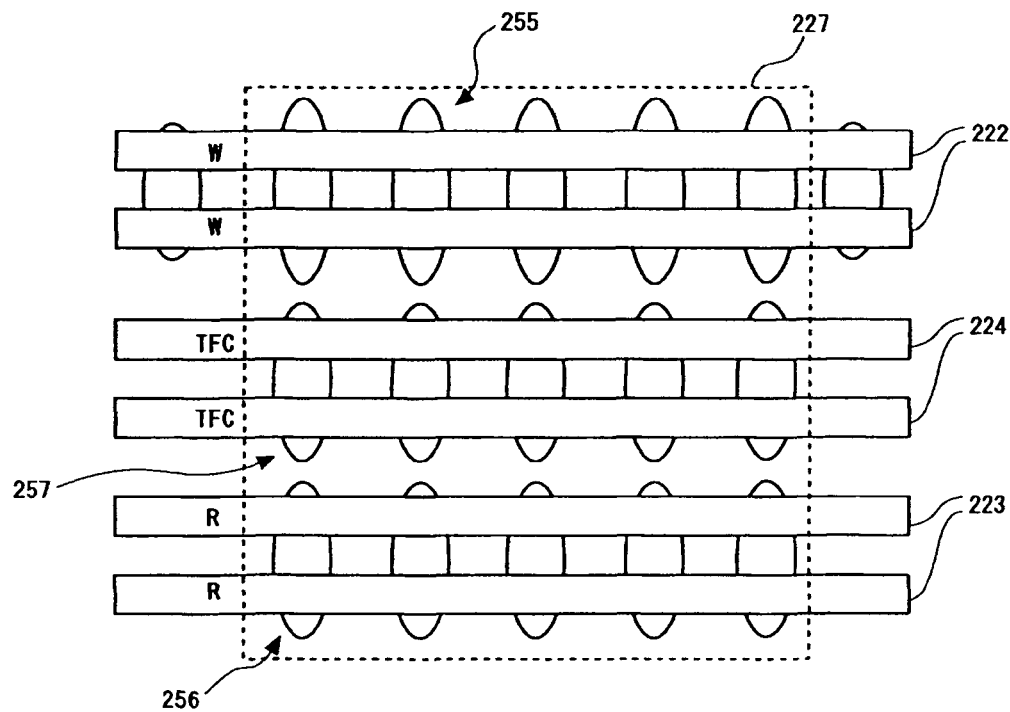
FIG. 8 is a schematic diagram illustrating another structure of transmission lines and hole sequences of the trace in the region opposed to the hinge portion according to the present embodiment.

FIG. 8 schematically illustrates the structure of another trace 122 in the region 227. In contrast to the structure of FIG. 6(*a*), the structure of FIG. 8 additionally includes a hole sequence 257 overlapping the TFC line pair 224. Similarly to the hole sequence 256 overlapping the read line pair 223, the hole sequence 257 terminates at both ends of the region 227, that is, no holes overlapping the TFC line pair 224 are formed in the other regions. The hole sequence 257 overlaps the TFC line pair 224 and is spaced apart from the other transmission lines and ensures that the hole sequence 257 can further reduce the rigidity of a portion of the trace 122 near the hinge portion 361.

The provision of the hole sequence 257 is likely to increase crosstalk noise resulting from the write signal toward the read signal. A transfer system in which the write signal has not-so-high frequency will not pose a problem of an increase in crosstalk noise caused by the hole sequence 257. Thus, for reduction in the rigidity of the trace 122, the hole sequence 257 is effective particularly in a non-high-speed transfer system.

Figure 9:
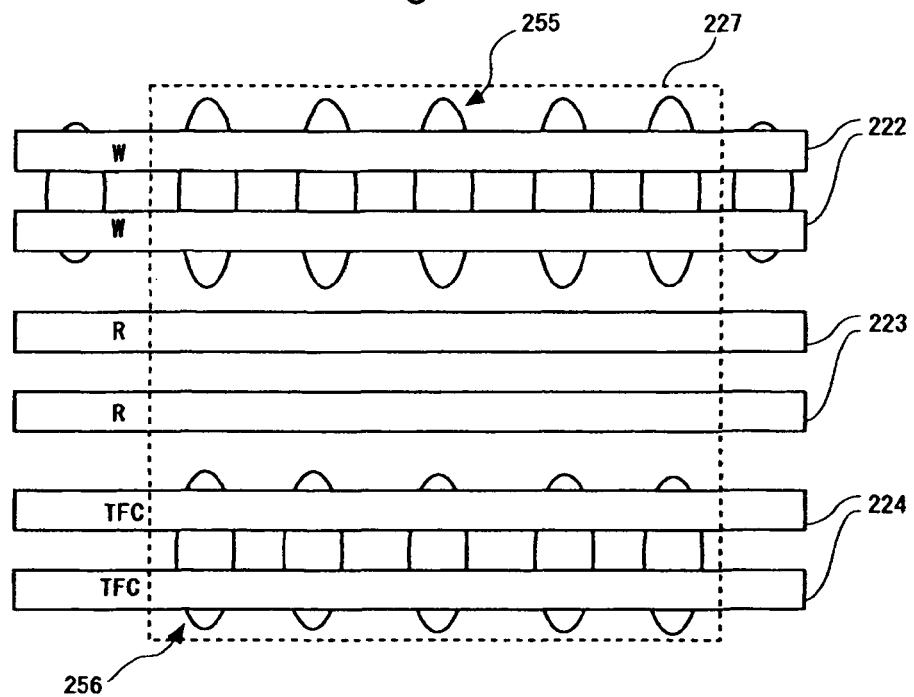
FIG. 9 is a schematic diagram illustrating another structure of transmission lines and hole sequences of the trace in the region opposed to the hinge portion according to the present embodiment.

FIG. 9 schematically illustrates the structure of another trace 122 in the region 227. The positions of a TFC line pair 224 and a read line pair 223 are in inverse relation to those of the structure in FIG. 6(*a*). As described above, it is preferred that the read line pair 223 should not be adjacent to the write line pair in order to reduce crosstalk noise resulting from the write signal toward the read signal. However, this design can be applied to a HDD for which the crosstalk noise does not cause a critical problem. Also in this structure, a hole sequence 255 overlapping the write line pair is spaced apart from the read line pair 223; therefore, noise resulting from an induction current will not cause a problem. In addition, the two hole sequences 256, 257 can reduce the rigidity of the region 227.

Figure 10:
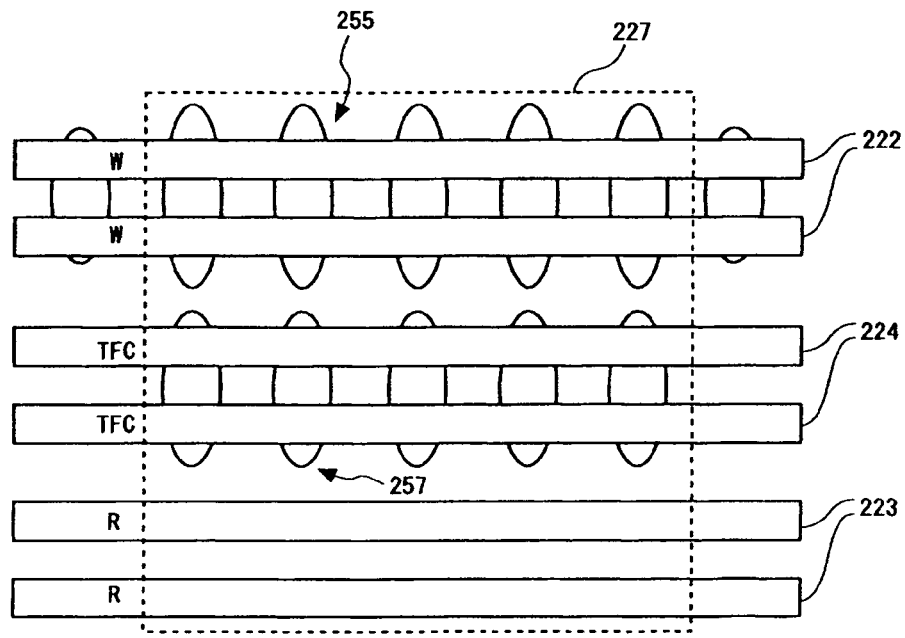
FIG. 10 is a schematic diagram illustrating another structure of transmission lines and hole sequences of the trace in the region opposed to the hinge portion according to the present embodiment.

FIG. 10 schematically illustrates the structure of another trace 122 in the region 227. As compared with the structure of FIG. 6(*a*), the structure of FIG. 10 includes a hole sequence 257 overlapping a TFC line pair 224. On the other hand, the structure of FIG. 10 does not include the hole sequence 256 overlapping a read line pair 223. In addition, a metal layer 123 below the read line pair 223 is in a plain state.

Since the TFC signal is an almost-unchanged, namely, constant signal compared with the write or read signal, it is hardly expected that the hole sequence 257 has an effect of reducing a transmission loss. In addition, the hole sequence 257 is likely to increase noise resulting from the magnetic field generated by the write signal toward the read signal. However, the rigidity of the region 227 can be reduced by forming the hole sequence 257 in addition to the hole sequence 255; therefore, such a structure can be selected depending on the design of a HDD.

Figure 11:
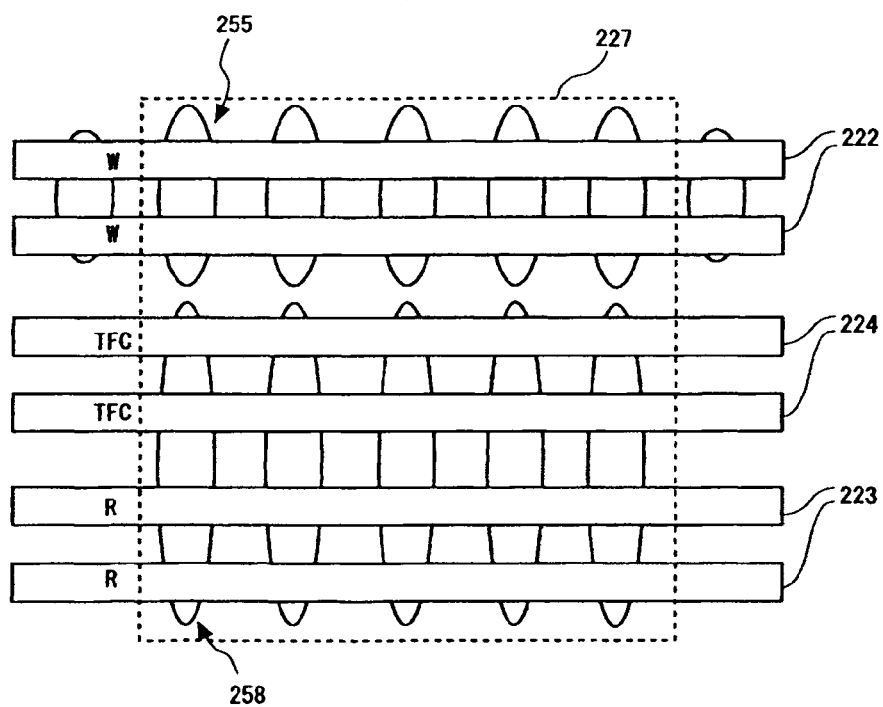
FIG. 11 is a schematic diagram illustrating another structure of transmission lines and hole sequences of the trace in the region opposed to the hinge portion according to the present embodiment.

Some designs of HDDs can adopt the trace structure illustrated in FIG. 11. The structure shown in FIG. 11 includes a hole sequence 258 overlapping both a read line pair 223 and a TFC line pair 224. The hole sequence 258 causes noise resulting from the write signal and superposed on noise relative to the TFC line pair 224 which tends to enter the read line pair 223. For this reason, it is preferred that other structures should be applied to design in which the transmission characteristics of the read signal are put above rigidity. Since the hole sequence 258 has a larger opening area than that of each of the other hole sequences 255-257, a portion of the trace corresponding to the hinge portion 361 can be further reduced in rigidity. Consequently, this structure can be applied to a HDD for which mechanical design is important.

While the present invention has been described thus far taking the preferred embodiments as examples, it is not limited to the above embodiments. It is possible for persons in the skilled in the art to easily change, add, or modify each element of the above embodiment in the scope of the present invention. For example, the trace may have a transmission line adapted to transmit other signals in place of or in addition to the TFC line pair. The trace may be provided with a transmission line adapted to transmit a signal to a piezoelectric element attached to the leading end of the actuator. Embodiments of the present invention can be applied to both perpendicular magnetic recording HDDs and longitudinal magnetic recording HDDs and to devices that use recording disks of other types.

Alternatively, not limited to the region opposed to the hinge portion, the hole sequences of embodiments of the present invention may be applicable to reduce the rigidity of another portion of the trace. Like the hole sequence overlapping the write line pair, another hole sequence can be formed beyond a region opposed to the hinge portion so as to cover the entire trace. In particular, the long hole sequence overlapping the read line pair contributes to a reduction in transmission loss. In view of a reduction in rigidity, a hole sequence overlapping another transmission line can be formed without formation of a hole sequence overlapping the write line pair. In this case, a hole sequence may not be formed in a unit of line pair. In the above embodiments, the trace is opposed to the hinge portion on the side of the suspension. However, the trace extends along the suspension, part of the trace overlaps the opening of the hinge portion, and a hole sequence is formed at the overlapping portion, whereby the rigidity can be reduced.

What is claimed is:

1. A head assembly comprising:
   a head adapted to access a disk on which data is recorded;
   a wiring support member supporting the head; and
   a wiring structure portion including:
   a metal layer;
   a plurality of transmission lines extending, without intersecting with each other, above the metal later and connected to the head; and
   an insulating layer formed between the metal layer and the plurality of transmission lines;
   wherein the plurality of transmission lines include:
   a write line pair adapted to transmit a write signal;
   a read line pair adapted to transmit a read signal; and
   a third line pair adapted to transmit a signal different from the write signal and the read signal; and
   wherein the metal layer has:
   a first hole sequence overlapping the write line pair, spaced apart from the other transmission lines and arranged in a direction where the write line pair extends; and
   a second hole sequence spaced apart from the write line pair, overlapping a line pair different from the write line pair and arranged in a direction where the line pair different from the write line pair extends,
   wherein, in a particular portion of the metal layer having a curved shape, the first hole sequence and the second hole sequence are arranged in a curved line, wherein the first hole sequence is positioned on the outer side of the curved line, and
   wherein, in the particular portion of the metal layer, the size of the bore diameter of the first hole sequence is larger than the size of the bore diameter of the second hole sequence,
   wherein the second hole sequence is formed only in a region opposed to a hinge portion included on a suspension.

2. The head assembly according to claim 1, wherein the second hole sequence overlaps the read line pair and is spaced apart from the other transmission lines.

3. The head assembly according to claim 1, wherein the third line pair extends along and between the write line pair and the read line pair.

4. The head assembly according to claim 2, wherein the metal layer has a third hole sequence overlapping the third line pair, spaced apart from the other transmission lines and arranged in a direction where the third line pair extends.

5. The head assembly according to claim 4, wherein the third line pair extends along and between the write line pair and the read line pair.

6. The head assembly according to claim 1, wherein a line pair adjacent to the write line pair extends along and between the line pair overlapped by the second hole sequence and the write line pair, the metal layer has no holes overlapping the line pair adjacent to the write line pair, between the first hole sequence and the second hole sequence.

7. The head assembly according to claim 6, wherein the line pair overlapped by the second hole sequence is the read line pair, and the line pair adjacent to the write line pair is the third line pair.

8. The head assembly according to claim 6, wherein the third line pair is connected to a heater in the head.

9. The head assembly according to claim 1, wherein the region opposed to the hinge portion included on the suspension has a higher concentration of holes in the first hole sequence and the second hole sequence than the remaining portions of the first hole sequence and the second hole sequence.

* * * * *